United States Patent Office 3,574,744
Patented Apr. 13, 1971

3,574,744
GUANIDINOALKYL DERIVATIVES OF
SUBSTITUTED ANILIDES
John Krapcho, Somerset, and Jack Bernstein, New Brunswick, N.J., assignors to E. R. Squibb & Sons, Inc., New York, N.Y.
No Drawing. Continuation-in-part of application Ser. No. 466,841, June 24, 1965. This application Oct. 26, 1967, Ser. No. 678,201
Int. Cl. C07c *103/30*
U.S. Cl. 260—558   10 Claims

ABSTRACT OF THE DISCLOSURE

This invention relates to new compounds of the general formula

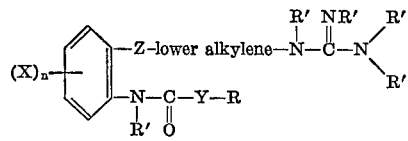

and to their acid addition salts and quaternary ammonium salts, compounds which have anti-serotonin activity and antimicrobial activity.

---

This application is a continuation-in-part of application Ser. No. 466,841, filed June 24, 1965, now abandoned.

SUMMARY OF THE INVENTION

This invention relates to new compounds, and more particularly, to bases of the general Formula I:

(I)
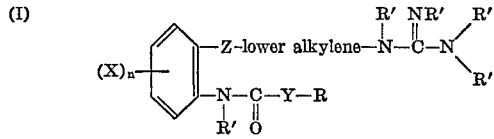

and to acid-addition and quaternary ammonium salts thereof, wherein X is hydrogen, halogen, trihalomethyl, nitro, amino, lower alkyl, lower alkoxy, hydroxy, lower alkylthio and lower alkanoyl; Y is lower alkylene, lower alkenylene, lower alkadienylene or lower alkynylene; Z is oxa (—O—) or thia (—S—), methylene (—CH$_2$—) or carbonyl

R' is hydrogen, lower alkyl, monocyclic aryl, or monocyclic aryl (lower alkyl); R is lower alkyl, cycloalkyl, and (X)$_n$-substituted phenyl, furyl, thienyl or pyridyl, and $n$ is 1, 2 or 3.

The alkylene groups are straight or branched aliphatic hydrocarbon chains including saturated divalent chains such as methylene, ethylene, propylene, isopropylene, butylene and the like. The lower alkenylene and lower alkadienylene groups are unsaturated chains of the same character having one or two double bonds, e.g., vinyl, propenyl, isopropenyl, butenyl, isobutenyl, butadienyl, pentadienyl, etc. The double bonds in the alkadiene chains may be in any position with respect to one another. The lower alkynylene groups are straight or branched chain aliphatic groups containing a triple bond, e.g.

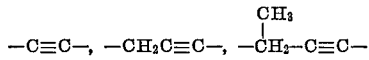

Lower alkyl groups represented by R and by X include groups such as methyl, ethyl, propyl, isopropyl, butyl, sec-butyl, t-butyl, amyl and the like. The lower alkoxy groups are ether groups containing lower alkyl groups of the type just referred to linked to the oxygen, e.g., methoxy, ethoxy, propoxy, isopropoxy and the like, and the lower alkanoyl groups are acyl radicals of the same character, e.g., acetyl, propionyl, butyryl, isobutyryl, etc. The cycloalkyl groups are cycloaliphatic groups containing preferably 3 to 7 carbon atoms, e.g., cyclopropyl, cyclobutyl, cyclopentyl, etc.

All four halogens are included, but chlorine and bromine are preferred, especially the former, except in the trihalomethyl group where fluorine is preferred.

The monocyclic aryl and monocyclic aryl (lower alkyl) groups include, for example, (X)$_n$-phenyl and (X)$_n$-phenyl-lower alkyl wherein X and $n$ have the meaning already defined, especially phenyl, benzyl and phenethyl.

The guanidino group is preferably unsubstituted. However, the amino as well as the imino groups of the guanidino radical may be substituted by groups represented by R'.

Preferred are those of Formula I wherein R is phenyl, each R' and X are all hydrogen and Z is thia. Y is preferably vinylidene.

The compounds of Formula I form salts which are also part of this invention. The salts include acid-addition salts, particularly the non-toxic physiologically acceptable acid-addition salts and quaternary ammonium salts. Acids useful for preparing the acid-addition salts include, for example, inorganic acids, such as the hydrohalic acids (e.g., hydrochloric and hydrobromic acid), sulfuric acid, nitric acid, boric acid and phosphoric acid, and organic acids, such as oxalic, tartaric, malic, citric, acetic, succinic, benzenesulfonic, cyclohexanesulfamic, and toluenesulfonic acid. The acid-addition salts frequently provide a convenient means for isolating the compound, e.g., by precipitating the salt in an appropriate menstruum in which the salt is insoluble, then, after separation of the salt, neutralizing with a base such as barium hydroxide or sodium hydroxide, to obtain the free base of Formula I.

Salts useful in preparing the quaternary ammonium salts include, for example, the lower alkyl halides and sulfates (e.g., methyl bromide and diethyl sulfate) and the monocyclic aryl (lower alkyl) halides and sulfates (e.g., benzyl chloride, benzyl sulfate), benzenesulfonates, toluenesulfonates and the like.

The novel compounds of this invention are substances which possess serotonin inhibitory activity. The compounds of this invention may be administered orally or parenterally to animal species, e.g., domestic and household animals, to produce relief from respiratory ailments, such as asthma and bronchial diseases. Tablets, capsules, elixirs, injectables and the like, incorporating about 10 mg. to about 250 mg. of the base of Formula I or a physiologically acceptable acid addition or quaternary ammonium salt thereof together with carriers, excipients, lubricants, etc., according to accepted pharmaceutical practice, may be administered at dosages of about 0.5 to 5 mg./kg. per day in single doses, or divided doses 2 to 4 times daily. They are also useful as anti-microbial agents, e.g., in combatting organisms such as *Staphylococcus aureus* or *Mycobacterium tuberculosis*. They may be used, for example, as surface disinfectants. About 0.1 to about 1.0% by weight of any of these substances may be incorporated in a soap or other cleansing agent such as solid or liquid detergent composition. These may be used for example in cleaning dairy, food handling or food processing equipment.

The compounds of this invention may be prepared by a variety of methods. The preferred and general method for preparing the compounds of this invention involves utilizing as starting material, a compound of the general Formula II:

(II)

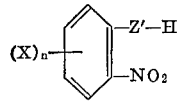

wherein Z' is oxa or thia and X and n have the same meaning as defined above, including for example, 2-nitrophenol; 2-nitro-benzenethiol; halo-2-nitrophenols, such as 4-chloro-2-nitrophenol, 4-bromo-2-nitrophenol, 5-chloro-2-nitrophenol, 5-bromo-2-nitrophenol, 6-chloro-2-nitrophenol, 4,6-dichloro-2-nitrophenol, and 4-bromo-6-chloro-2-nitrophenol; halo-2-nitrobenzenethiols, such as 4-chloro-2-nitrobenzenethiol, 4-bromo-2-nitrobenzenethiol, 5-chloro-2-nitrobenzenethiol and 4,6-dichloro-2-nitrobenzenethiol; trifluoromethyl-2-nitrophenols, such as 4-trifluoromethyl-2-nitrophenol and 5-trifluoromethyl-2-nitrophenol; trifluoromethyl-2-nitrobenzenethiols, such as 4-trifluoromethyl-2-nitrobenzenethiol and 5-trifluoromethyl-2-nitrobenzenethiol; (lower alkyl)-2-nitrophenols, such as 4-methyl-2-nitrophenol, 5-ethyl-2-nitrophenol, 4-isopropyl-2-nitrophenol, 5-n-hexyl-2-nitrophenol, 4,6-dimethyl-2-nitrophenol, 3,4,5-trimethyl-2-nitrophenol, 4,6-diethyl-2-nitrophenol, and 3-methyl-5-ethyl-2-nitrophenol; (lower alkyl)-2-nitrobenzenethiols, such as 5-methyl-2-nitrobenzenethiol, 4-ethyl-2-nitrobenzenethiol, 4,6-dimethyl-2-nitrobenzenethiol, and 3,4,5-trimethyl-2-nitrobenzenethiol; (lower alkoxy)-2-nitrophenols, such as 4-methoxy-2-nitrophenol, 5-ethoxy-2-nitrophenol, 4-propoxy-2-nitrophenol, 4,6-diethoxy-2-nitrophenol and 3,4,5-trimethoxy-2-nitrophenol; (lower alkoxy)-2-nitrobenzenethiols, such as 4-methoxy-2-nitrobenzenethiol, 5-ethoxy-2-nitrobenzenethiol, 4,6-diethoxy-2-nitrobenzenethiol and 3,4,5-trimethoxy-2-nitrobenzenethiol; (lower alkanoyl)-2-nitrophenols, such as 4-acetyl-2-nitrophenol, 5-acetyl-2-nitrophenol, 3-propionyl-2-nitrophenol and 5-hexanoyl-2-nitrophenol; (lower alkanoyl)-2-nitrobenzenethiols, such as 4-acetyl-2-nitrobenzenethiol, 5-acetyl-2-nitrobenzenethiol, 3-propionyl-2-nitrobenzenethiol and 5-hexanoyl-2-nitrobenzenethiol, (lower alkylthio)-2-nitrobenzenethiols, such as 4-methylthio-2-nitrobenzenethiol, and (lower alkylthio)-2-nitrophenols, such as 4-methylthio-2-nitrophenol, etc.

The nitro group of such starting materials is reduced catalytically, as by treatment with hydrogen in the presence of a hydrogenation catalyst, such as 5% palladium-carbon, or chemically, as by treatment with stannous chloride or sodium hydrosulfite, to yield intermediates of the general Formula III:

(III)

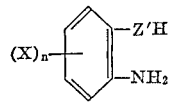

wherein X, n and Z' are as hereinbefore defined, and the resulting amine is then reacted with a compound of the Formula IV:

(IV)

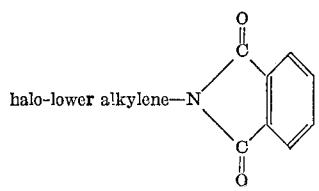

chlorine being the preferred halogen.

The intermediates which are thus formed have the Formula V:

(V)

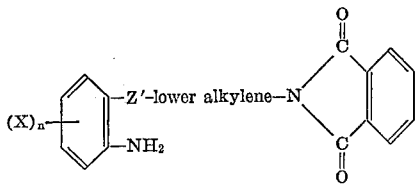

These intermediates are next reacted with a compound of the Formula VI:

(VI) 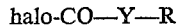

the symbols having the meaning previously defined.

Suitable starting materials of the Formula VI include: lower alkanoyl chlorides, such as acetyl chloride, propionyl chloride and hexanoyl chloride; lower alkenoyl chlorides, such as the acyl chlorides of acrylic acid, crotonic acid, 2-pentenoic acid, 2-hexenoic acid, 2-octenoic acid, 3-methylcrotonic acid, 2-methylcrotonic acid, 2-ethylacrylic acid, 2,3-dimethylcrotonic acid and 4-methyl-2-pentenoic acid; lower alkynoyl chlorides, such as the acyl chlorides of propynoic acid, butynoic acid, 2-pentynoic acid, 2-hexynoic acid and 2-octynoic acid; lower alkadienoyl chlorides, such as sorboyl chloride; cycloalkane carbonyl chlorides, such as hexahydrobenzoyl chloride and cyclopentane carbonyl chloride; cycloalkane lower alkanoyl chlorides, such as cyclohexylacetyl chloride, 3-cyclohexylpropionyl chloride, and cyclopentylacetyl chloride; benzoyl chloride; substituted benzoyl chlorides, such as 2,4,6-trimethoxy-benzoyl chloride; phenyl(lower alkanoyl) chlorides, such as phenacetyl chloride, 2-phenylpropanoyl chloride, 4-phenylbutanoyl chloride, and 6-phenylhexanoyl chloride; (substituted phenyl) (lower alkanoyl) chlorides; phenyl(lower alkenoyl) chlorides, such as the acyl chlorides of cinnamic acid, 3-phenylcrotonic acid, 3-phenyl-2-pentenoic acid, 3-phenyl-2-hexenoic acid, 2-methylcinnamic acid, 2-ethylcinnamic acid and 3-phenyl-4-methyl-2-pentenoic acid; (substituted phenyl) (lower alkenyl) chlorides, such as the acyl chlorides of m-nitrocinnamic acid, p-methylcinnamic acid, o,α-dimethylcinnamic acid, p-ethylcinnamic acid, m,p-dimethoxycinnamic acid, p-methoxycinnamic acid, 2,4,6-trimethoxycinnamic acid, 2-ethyl-p-ethoxycinnamic acid, p-trifluoromethylcinnamic acid, o-chlorocinnamic acid, p-chlorocinnamic acid, 3-o-tolylcrotonic acid, 2,4-dichlorocinnamic acid, and 3-p-methoxyphenyl-2-pentenoic acid; phenyl(lower alkynyl) chlorides; (substituted phenyl) (lower alkynyl) chlorides, such as p-chlorophenyl-propiolyl chloride; furoyl chloride; furyl(lower alkanoyl) chlorides, such as 2-furylacetyl chloride and 2-furylpropionyl chloride; furyl(lower alkenoyl) chlorides, such as 3-(2-furyl)acrylyl chloride and 3-(2-furyl)crotonyl chloride; furyl(lower alkynoyl) chlorides; 2-thiophene carbonyl chloride; thienyl(lower alkanoyl) chlorides, such as 2-thienylacetyl chloride and 2-thienylpropionyl chloride; thienyl(lower alkenoyl) chlorides, such as 3-(2-thienyl)acrylyl chloride and 3-(2-thienyl)crotonyl chloride; thienyl(lower alkynoyl) chlorides; 2-pyridinecarbonyl chloride; nicotinoyl chloride; isonicotinoyl chloride; pyridyl(lower alkanoyl) chlorides, such as 4-pyridylacetyl chloride and 3-(3-pyridyl)propionyl chloride; pyridyl(lower alkenoyl) chlorides, such as 3-(4-pyridyl)acrylyl chloride and 3-(2-pyridyl)crotonyl chloride; pyridyl(lower alkynoyl) chlorides; piperonyl carbonyl chloride; piperonyl(lower alkanoyl) chlorides, such as piperonylacetyl chloride and 3-piperonylpropionyl chloride; piperonyl(lower alkenoyl) chlorides, such as 3-piperonylacrylyl chloride and 3-piperonylcrotonyl chloride; and piperonyl(lower alkynoyl) chlorides.

The intermediates of the following formula thus obtained VII:

(VIII)

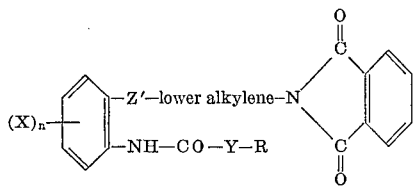

is next treated with hydrazine, e.g., with 85% hydrazine hydrate in chloroform-methanol to convert it to the intermediate of the Formula VIII:

(VIII)

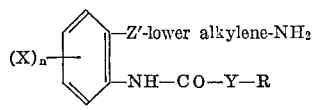

and then the final product of Formula I is obtained by reacting VIII with 2-methyl-2-thiopseudourea or an R'-substituted derivative, e.g., N,N,N'-trimethyl-S-methyl-thiopseudourea, N,N,N'-trimethyl - S - methyl-thiopseudourea, in an inert organic solvent such as dimethylformamide.

The intermediate of Formula VIII may alternatively be heated with cyanamide or an N-substituted cyanamide, e.g., dimethylcyanamide, or with 3,5-dimethylpyrazole-1-carboxamidine or with S-ethylpseudothiourea.

When the R' on the $N^1$ of the guanidine group in Formula I is other than hydrogen, a compound of the formula (IX)

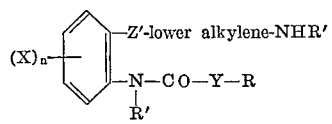

wherein R' is other than hydrogen, is used in place of the compound of Formula VIII.

When X is amino, it is preferable to use as starting material a compound having a nitro group on the phenyl ring, and reducing that nitro group as the last step in the synthesis. Similarly, when X is hydroxy, an alkoxyphenyl starting compound is used and the alkoxy group is converted with hydrogen bromide to the hydroxy group as the last step.

The compounds of this invention wherein Z is thia may also be prepared by employing a benzothiazepin-4-one of the general Formula X as the starting material (X)

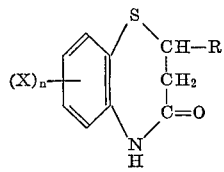

wherein X, n, and R are as hereinbefore defined. The benzothiazepin-4-one is reacted with sodamide or sodium methylate to cleave the ring to yield intermediates of this invention of the general Formula XI:

(XI)

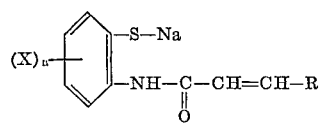

wherein X, n and R are as hereinbefore defined.

Compound XI is then reacted with a haloalkylenephthalimide of Formula IV to yield a final product of Formula VII and then proceeding from that point as described before.

Suitable starting materials of the Formula IX include: 3,5-dihydro-1,5-benzothiazepin-4-one; 3,5-dihydro-2-(lower alkyl)-1,5-benzothiazepine-4-ones, such as 3,5-dihydro-2-methyl-1,5-benzothiazepin-4-one and 3,5-dihydro-2-n-butyl-1,5-benzothiazepin-4-one; 3,5-dihydro-2-phenyl-1,5-benzothiazepin-4-one; 3,5 - dihydro-2-halophenyl-1,5-benzothiazepin-4-ones, and 3,5-dihydro-2-o-bromophenyl-1,5-benzothiazepin-4-one; 3,5-dihydro-2-trifluoromethylphenyl-1,5-benzothiazepin-4-ones; 3,5-dihydro-2-(lower alkyl) phenyl-1,5-benzothiazepin-4-ones, such as 3,5-dihydro-2-p-tolyl-1,5-benzothiazepin-4-one; 3,5-dihydro - 2 - (lower alkoxy)phenyl-1,5-benzothiazepin-4-ones; 3,5 - dihydro-2-phenyl(lower alkyl)-1,5-benzothiazepin-4-ones, such as 3,5-dihydro-2-benzyl-1,5-benzothiazepin-4-one; 3,5 - dihydro-2-furyl-1,5-benzothiazepin-4-one; 3,5-dihydro-2-thienyl-1,5-benzothiazepin-4-one; 3,5-dihydro - 2 - pyridyl-1,5-benzothiazepin-4-ones; 3,5-dihydro-2-piperonyl-1,5-benzothiazepin-4-one; and benzo substituted derivatives thereof, such as halo, trifluoromethyl, nitro, lower alkyl and lower alkoxy substituted derivatives, as exemplified by 7-chloro-3,5-dihydro-1,5-benzothiazepin-4-one, 2-phenyl-7-trifluoromethyl-3,5-dihydro-1,5-benzothiazepin - 4 - one, 2-phenyl-8-nitro-3,5-dihydro-1,5-benzothiazepin - 4 - one, 2,7-dimethyl-3,5-dihydro - 1,5 - benzothiazepin-4-one, and 7-methoxy-3,5-dihydro-1,5-benzothiazepine-4-one.

To prepare those compounds of this invention wherein R' is lower alkyl or monocyclic aryl(lower alkyl), compounds of the general Formula VII are alkylated, e.g., with lower alkyl halides or monocyclic aryl(lower alkyl) halides to give compounds of the structure (XII)

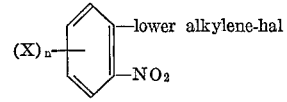

and then proceeding as described after Formula VII above where R' is hydrogen.

To obtain the compounds of this invention wherein Z is methylene, an o-nitrophenyl-lower alkyl halide of the formula (XIII)

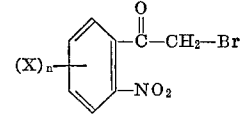

is reacted with potassium phthalimide and the reaction product is treated to catalytically reduce the nitro group thereby producing a compound corresponding to formula, but Z' is then methylene.

Suitable starting materials of Formula XIII include for example, 2-nitrobenzyl bromide, halo-2-nitrobenzyl bromides such as 4-chloro-2-nitrobenzyl bromide, 5-bromo-2-nitrobenzyl bromide, 4 - bromo - 6-chloro-2-nitrobenzyl bromide, 4,6-dibromo-2-nitrobenzyl bromide, 4-trifluoromethyl - 2 - nitrophenethyl bromide, 4 - trifluoromethyl-2-nitrophenethyl bromide, lower alkyl-2-nitrophenethyl bromides such as 4-methyl-2-nitrophenethyl bromide, lower alkanoyl-2-nitrophenylpropyl bromides such as 5-acetyl-2-nitrophenylpropyl bromide etc.

When Z in Formula I is carbonyl, the products of this invention are produced as follows. When the lower alkylene group adjacent that carbonyl is methylene, a compound of the formula (XIV)

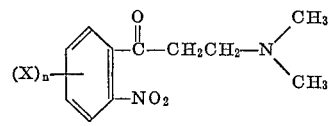

is used as starting material and first reacted with potassium phthalimide. When the adjacent lower alkylene group has two carbon atoms, the starting material has the formula (XV)

and this is reacted with phthalimide. When the lower alkylene group has more than two carbon atoms, the starting material is (XVI) 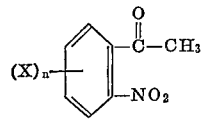

and this is reacted with a haloalkylphthalimide in which the alkyl group has at least two carbon atoms.

In each of the three instances, the reaction product has the formula (XVII) 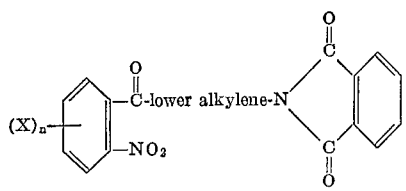

The nitro group in XVI is then catalytically reduced ot an amino group yielding a product having the same structure as Formula V except that Z' is carbonyl. This intermediate is then processed as described after Formula V. The symbols in Formulas XIII to XVI have the same meaning as defined before.

The acid-addition and quaternary ammonium salts are prepared in the usual manner by the treatment of the free base with at least one equivalent of the desired acid or quaternizing agent. Frequently, acid salts are obtained directly by utilizing an acid salt of one of the reactants in the final step of the reaction sequence, e.g., 2-methyl-2-pseudothiourea sulfate, 3,5-dimethylpyrazole-1-carboxamidine nitrate or 5-ethylpseudothiourea hydrobromide. Other salts may be obtained by neutralizing with a base such as barium hydroxide or sodium hydroxide to obtain the free base, then reacting with another acid.

The following examples are illustrative of the invention. All temperatures are expressed on the centigrade scale.

EXAMPLE 1

2'-[(2-guanidinoethyl)thio]cinnamanilide, salt with one-half mole of sulfuric acid (a) N - [2-(2-aminophenylthio)ethyl]phthalimide.—A solution of 28.0 g. of 2-aminobenzenethiol in 70 ml. of isopropyl alcohol is added to a stirred suspension of 12 g. of sodium methylate in 400 ml. of isopropyl alcohol. After stirring at room temperature for 20 minutes, the mixture is treated with 50.0 g. of N-(2-bromoethyl) phthalimide and then refluxed for 3 hours. The solvent is removed under reduced pressure, the residue is cooled and treated with 300 ml. of chloroform and 200 ml. of water. The organic phase is treated with Darco charcoal, filtered and the filtrate diluted with hexane to give 45 g. of product, M.P. 110–113°. After crystallization from 120 ml. of benzene, the material weighs 34.0 g. (58%); M.P. 115–117°.

(b) 2' - (2 - phthalimidoethylthio)cinnamanilide.—A solution of 32.0 g. (0.11 mole) of the above compound and 11.0 g. (0.11 mole) of triethylamine in 140 ml. of chloroform is added dropwise to a stirred solution of 18.0 g. (0.11 mole) of cinnamoyl chloride in 200 ml. of chloroform while maintaining the temperature at 10°. The mixture is stirred for 1 hour at room temperature, refluxed for 1 hour, cooled and washed 4 times with 100 ml. portions of water. The organic phase is dried over magnesium sulfate, concentrated to about 100 ml. and the residue is diluted with hexane to give 45 g. of product; M.P. 144–147°. After recrystallization from 200 ml. of benzene, the colorless material weighs 35.0 g. (76%); M.P. 147–149°.

(c) 2' - (2 - aminoethylthio)cinnamanilide hydrochloride.—A solution of 33.0 g. (0.077 mole) of the above compound in 160 ml. of chloroform and 80 ml. of methanol is treated with 8.0 g. (0.14 mole) of 85% hydrazine hydrate. A solid separates from the solution after about 3 hours. After standing for 1 day at room temperature, the solvent is removed under reduced pressure and the residue is treated with 120 ml. of water followed by a solution of 8.5 g. of potassium hydroxide in 20 ml. of water. The mixture is extracted 3 times with 400 ml. portions of ether and the combined extracts dried over magnesium sulfate. The mixture is filtered and the filtrate treated with a slight excess of ethereal hydrogen chloride to give 16.0 g. of colorless product, M.P. 177–180°. After recrystallization from 300 ml. of isopropyl alcohol, the material weighs 12.2 g. (47%); M.P. 181–183°.

(d) 2-(2-aminoethylthio)cinnamanilide.—A suspension of 5.0 g. of material from part (c) in 200 ml. of water is treated with a slight excess of sodium hydroxide solution. The liberated base is extracted with 200 ml. of ether; the ether solution is dried over magnesium sulfate and the solvent evaporated to give 4.4 g., M.P. 85–87°.

(e) 2'-[(2-guanidinoethyl)thio]cinnamanilide, salt with one-half mole of sulfuric acid.—A mixture of 4.0 g. of material from part (d), 2.0 g. of 2-methyl-2-thiopseudourea sulfate and 50 ml. of dimethylformamide is refluxed for 2 hours. After cooling to room temperature, the unreacted 2-methyl-2-thiopseudourea sulfate is filtered and the filtrate concentrated on a steam bath at 2 mm. pressure. The residue is triturated with acetone and ether to give 3.1 g. of solid. This material is suspended in 150 ml. of water and 50 ml. of chloroform and treated with about 10 g. of potassium carbonate. The resulting oily material is separated and triturated with ether to give 2.8 g. of colorless solid. The latter is dissolved in 20 ml. of methanol and the solution added to 200 ml. of ether to give 2.0 g. of material, M.P. about 210–212° (dec., with sintering at 105–107°).

EXAMPLE 2

2'-[(3-guanidinopropyl)thio]cinnamanilide, salt with one-half mole of sulfuric acid (a) Preparation of 2'-(3-phthalimidopropylthio)cinnamanilide.—A suspension of 94 g. of 2,3-dihydro-2-phenyl-1,5-benzothiazepin-4-(5H)-one in 175 ml. of isopropyl alcohol is added to a solution of 20 g. of sodium methylate in 550 ml. of isopropyl alcohol and the mixture is refluxed for 20 minutes. The orange-red solution is cooled to 40°, treated with 100 g. of N-(3-bromopropyl) phthalimide and the resulting mixture is stirred and refluxed for 4.5 hours. The bulk of the solvent is removed under reduced pressure and the residue is treated with 1 l. of water and 400 ml. of hexane. The mixture is stirred vigorously and filtered to give 162 g. of crystalline product, M.P. 104–107° After crystallization from 500 ml. of benzene, 200 ml. of hexane, the colorless material weighs 135.5 g., M.P. 107–109°.

(b) Preparation of 2'-[(3-guanidinopropyl)thio]cinnamanilide, salt with one-half mole of sulfuric acid.—The material from part (a) is reacted according to the procedures of Example 1, parts (c–e) to give 2'-[(3-guanidinopropyl)thio]cinnamanilide, salt with one-half mole of sulfuric acid.

EXAMPLE 3

5' - chloro - 2' - [(guanidinoethyl)thio]cinnamanilide, salt with one-half mole of sulfuric acid Following the procedure of Example 1, but substituting 35.0 g. of 4-chloro-2-aminobenzenethiol for the 2-aminobenzenethiol in part (a), 5'-chloro-2'-[(2-guanidinoethyl)thio]cinnamanilide, salt with one-half mole of sulfuric acid is obtained.

EXAMPLE 4

5'-trifluoromethyl - 2' - [(2 - guanidinoethyl)thio]cinnamanilide, salt with one-half mole of sulfuric acid Following the procedure of Example 1, but substituting 42.5 g. of 4-trifluoromethyl-2-aminobenzenethiol for the 2-aminobenzenethiol in part (a), 5'-trifluoromethyl-2'-[(2-guanidinoethyl)thiol]cinnamanilide, salt with one-half mole of sulfuric acid is obtained.

EXAMPLE 5

2'-[(2-guanidinoethyl)thio] - p - nitrocinnamanilide, salt with one-half mole of sulfuric acid By substituting an equivalent quantity of p-nitrocinnamoyl chloride for the cinnamoyl chloride in part (b) of Example 1, 2'-[(2-guanidinoethyl)thio]-p-nitrocinnamanilide, salt with one-half mole of sulfuric acid, is obtained.

In a similar manner, the substitution of equivalent quantities of m-methylcinnamoyl chloride, 3,4,5-trimethoxycinnamoyl chloride, 2,4-dichlorocinnamoyl chloride, acetyl chloride, butyroyl chloride, cyclohexanecarbonyl chloride, phenylacetyl chloride, 2-methylthiobenzoyl chloride, crotonyl chloride, sorboyl chloride, phenylpropiolyl chloride and furoyl chloride for the cinnamoyl chloride gives the hemi-sulfate salts of 2'-[(2-guanidinoethyl)thio]-m-methylcinnamanilide, 2' - [(2 - guanidinoethyl)thio-3,4,5-trimethoxycinnamanilide, 2' - [(2-guanidinoethyl)thio]-2,4-dichlorocinnamanilide, 2' - [(2-guanidinoethyl)thio]acetanilide, 2' - [(2 - guanidinoethyl)thio]butyroanilide, 2' - [(2 - guanidinoethyl)thio]hexahydrobenzanilide, 2'-[(2-guanidinoethyl)thio]phenacetanilide, 2'-[(2-guanidinoethyl)thio]-2 methoxybenzamide, 2'-[(2-guanidinoethyl)thio] - 2 - croton-anilide, 2'-[(2-guanidinoethyl)thio]-2-sorbanilide, 2' - [(2 - guanidinoethyl)thio]phenylpropiolylanilide, and 2' - [(2-guanidinoethyl)thio]furanilide, respectively.

EXAMPLE 6

2'(2-guanidinoethyl)cinnamanilide, salt with one-half mole of sulfuric acid

Interaction of o-nitrophenethyl bromide with potassium phthalimide gives N(o-nitrophenethyl)phthalimide. Catalytic reduction of this material with palladium-carbon in ethanol gives N-(o-aminophenyl)phthalimide. Then, following the procedure of Example 1, parts (b–e), gives 2'-(2-guanidinoethyl)cinnamanilide, salt with one-half mole of sulfuric acid.

EXAMPLE 7

2'-(2-guanidinoethoxy)cinnamanilide, salt with one-half mole of sulfuric acid

Interaction of o-nitrophenol with N-(2-bromoethyl)phthalimide according to the general procedure described in part (a) of Example 1, gives N-[2-(2-nitrophenoxy)ethyl]-phthalimide. Catalytic reduction of this material with hydrogen using palladium-carbon catalyst in ethanol gives N-[2 - (2 - aminophenoxy)ethyl]phthalimide. Then, following the procedure of Example 1, parts (b–e), gives 2'-(2-guanidinoethyl)cinnamanilide, salt with one-half mole of sulfuric acid.

EXAMPLE 8

5'-acetyl - 2' - (2-guanidinoethyl)cinnamanilide, salt with one-half mole of sulfuric acid Substitution of 4-hydroxy-3-nitroacetophenone for the o-nitrophenol in Example 7 gives 5'-acetyl-2'-(2-guanidinoethyl)cinnamanilide.

EXAMPLE 9

5'-nitro-2'-(2-guanidinoethyl)cinnamanilide, salt with one-half mole of sulfuric acid Substitution of an equivalent quantity of 4-nitro-2-aminophenol for the 2-aminobenzenethiol in Example 1, part (a), gives 5'-nitro-2'-(2-guanidinoethyl)cinnamanilide, salt with one-half mole of sulfuric acid.

EXAMPLE 10

5'-amino-2'-(2-guanidinoethyl)-cinnamanilide, salt with one-half mole of sulfuric acid Catalytic reduction of the material from Example 9 with hydrogen using palladium-carbon catalyst in ethanol solution gives 2'-amino-2'-(2-guanidinoethyl)-cinnamanilide, salt with one-half mole of sulfuric acid.

EXAMPLE 11

2'-(3-guanidinopropionyl)cinnamanilide, salt with one-half mole of sulfuric acid Interaction of 2'-(3-dimethylaminopropionyl)cinnamanilide with phthalimide gives 2'-(3-phthalimidopropionyl)cinnamanilide. Then, following the procedures of Example 1, parts (c–e), gives 2'-(3-guanidinopropionyl)cinnamanilide, salt with one-half mole of sulfuric acid.

EXAMPLE 12

2'-(3-guanidinopropionyl)-4'-methoxycinnamanilide, salt with one-half mole of sulfuric acid By substituting an equivalent quantity of 2'-(3-dimethylaminopropionyl)-4'-methoxycinnamanilide for the 2'-(3 - dimethylaminopropionyl)cinnamanilide of Example 11, there is obtained 2'-(3-guanidinopropionyl)-4'-methoxycinnamanilide, salt with one-half mole of sulfuric acid.

EXAMPLE 13

2'-(3-guanidinopropionyl)-4'-hydroxycinnamanilide hydrobromide

Interaction of the material of Example 12 with hydrogen bromide in glacial acetic acid gives 2'-(3-guanidinopropionyl)-4'-hydroxycinnamanilide hydrobromide.

EXAMPLE 14

N-methyl-2'-[(2-guanidinoethyl)thio]cinnamanilide, salt with one-half mole of sulfuric acid Interaction of the material from part (b) of Example 1 with equivalent quantities of sodium hydride and methyl iodide gives N-methyl-2'-(2-phthalimidoethylthio)cinnamanilide. Then, following the procedures of Example 1, parts (c–e), gives N-methyl-2'-[(2-guanidinoethyl)thio]cinnamanilide, salt with one-half mole of sulfuric acid.

EXAMPLE 15

N-benzyl-2'-[(2-guanidinoethyl)thio]cinnamanilide, salt with one-half mole of sulfuric acid Utilizing the procedure of Example 14, but substituting an equivalent amount of benzyl chloride for the methyl iodide, N-benzyl-2'-[(2-guanidinoethyl)thio]cinnamanilide, salt with one-half mole of sulfuric acid is obtained.

EXAMPLE 16

2'-{[2-(1-methylguanidino)ethyl]thio}cinnamanilide, salt with one-half mole of sulfuric acid By substituting an equivalent quantity of 2'-(2-methylaminoethylthio)cinnamanilide for the 2'-(2-aminoethylthio)cinnamanilide in Example 1, part (e), there is obtained 2'-{[2-(1 - methylguanidino)ethyl]thio}cinnamanilide, salt with one-half mole of sulfuric acid.

EXAMPLE 17

2'-{[2-(1-methylguanidino)ethyl]thio}cinnamanilide methoiodide

A suspension of 39.0 g. of material from Example 16 above in 200 ml. of water is treated with a solution of 9.0 g. of barium hydroxide in 50 ml. of water. The liberated base is extracted with 200 ml. of chloroform (5 times). The chloroform solutions are combined, dried over magnesium sulfate, filtered and treated with 15.0 g. of methyl iodide. After standing for 2 days at room temperature, the solvent is removed to give 2'-{[2-(1-methylguanidino)ethyl]thio}cinnamanilide methoiodide.

EXAMPLE 18

2'-{[2-(2,3,3-trimethylguanidino)ethyl]thio}cinnamanilide, salt with one-half mole of sulfuric acid By substituting an equivalent quantity of 1,2,3-tetramethyl-2-pseudothiourea for the 2-methyl-2-pseudothiourea of Example 1, part (e), gives 2'-{[2-(2,3,3-trimethylguanidino)ethyl]thio}cinnamanilide, salt with one-half mole of sulfuric acid.

EXAMPLE 19

2'-{[2-(3-phenylguanidino)ethyl]thio}cinnamanilide, salt with one-half mole of sulfuric acid By substituting an equivalent quantity of 1-phenyl-2-methyl-2-pseudothiourea for the 2-methyl-2-thiopseudourea of Example 1, part (e), there is obtained 2'-{[2-(3-phenylguanidino)ethyl]thio}cinnamanilide, salt with one-half mole of sulfuric acid.

EXAMPLE 20

4',5',6'-trichloro-2'-[(2-guanidinoethyl)thio]cinnamanilide

Following the procedure of Example 1, but substituting 3,4,5-trichloro-2-aminobenzenethiol for the 2-aminobenzenethiol in part (a), 4',5',6'-trichloro-2'-[(2-guanidinoethyl)thio]cinnamanilide is obtained.

EXAMPLE 21

4',5'-dimethoxy-2'-[(2-guanidinoethyl)thio]cinnamanilide

Following the procedure of Example 1, but substituting 3,4-dimethoxy-2-aminobenzenethiol for the 2-aminobenzenethiol in part (a), 4',5'-dimethoxy-2'-[(2-guanidinoethyl)thio]cinnamanilide is obtained.

EXAMPLE 22

2'-[(2-guanidinoethyl)thio]-β-(α-thiophene)acrylylanilide

Following the procedure of Example 1, but substituting the acid chloride of thiopheneacrylic acid for the cinnamoyl chloride in part (b), is obtained 2'-[(2-guanidinoethyl)thio]-β-(α-thiophene)acrylylanilide.

EXAMPLE 23 o-{[2-(1,3,3-trimethylguanidino)ethyl]thio}cinnamanilide, hydrochloride

A mixture of 2.3 g. (0.0066 mole) of 2'-[2-(methylamino)ethylthio]cinnamanilide, hydrochloride, 3.0 g. (0.043 mole) of dimethylcyanamide [prepared by the method of Kuhn and Mecke, Chem. Ber., 93, 621 (1960)], and 15 ml. of dimethylformamide is refluxed for 20 hrs. The solution is cooled to room temperature and diluted with several volumes of ether to precipitate the product as a dark gum which gradually crystallizes on "scratching" and cooling. The solid is collected, washed with ether, and dried in vacuo. The crude yield of tan, slightly tacky, material is 2.4 g. (83%). Crystallization from 25 ml. of acetonitrile gives 1.0 g. (35%) of nearly colorless product; M.P. 148–150° (s. 138°).

EXAMPLE 24

2'-{[2-(1-methylguanidino)ethyl]thio}cinnamanilide, hydrochloride

A mixture of 10 g. (0.029 mole) of 2'-[2-(methylamino)ethylthio]cinnamanilide, hydrochloride, 10 g. (0.24 mole) of cyanamide and 50 ml. of absolute alcohol is refluxed under nitrogen for 20 hrs. On cooling the solution to room temperature, diluting with ether to cloudiness, and "scratching," a crystalline solid separates. This is collected after cooling overnight, washed with ether, and dried in vacuo. The yield of colorless material is 8.7 g. (78%); M.P. 171–174°. Crystallization from 375 ml. of isopropyl alcohol gives 6.2 g. (55%) of product; M.P. 174–176°.

What is claimed is:

1. A member of the group consisting of bases of the formula

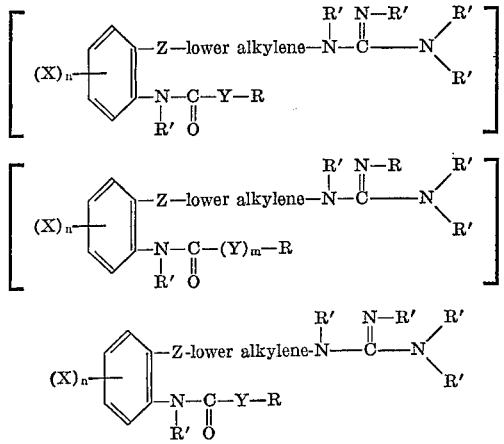

wherein X is a member of the group consisting of hydrogen, halogen, trifluoromethyl, nitro, amino, lower alkyl, lower alkoxy, hydroxy, lower alkylthio and lower alkanoyl, Y is a member of the group consisting of lower alkylene, lower alkenylene, and lower alkadienylene, Z is a member of the group consisting of oxa, thia, methylene and carbonyl, R is a member of the group consisting of lower alkyl, cyclo-lower alkyl, $(X)_n$-phenyl, furyl, thienyl and pyridyl, R' is a member of the group consisting of hydrogen, lower alkyl, phenyl and phenyl(lower alkyl), and $n$ is an integer from 1 to 3, with the proviso that $n$ is 1 when X is trifluoromethyl, and acid addition salts and quaternary ammonium salts of said bases.

2. A compound according to claim 1 wherein X and each R' are hydrogen, Y is lower alkylene, Z is sulfur, R is phenyl and $n$ is 1.

3. A compound as in claim 1 wherein X and each R' are hydrogen, Y is lower alkylene, Z is oxygen, R is phenyl and $n$ is 1.

4. A compound as in claim 1 wherein X and each R' are hydrogen, Y is lower alkenylene, Z is sulfur, R is phenyl and $n$ is 1.

5. A compound as in claim 1 wherein X and each R' are hydrogen, Y is lower alkenylene, Z is methylene, R is phenyl and $n$ is 1.

6. A compound as in claim 1 wherein X and each R' are hydrogen, Y is lower alkenylene, Z is oxygen, R is phenyl and $n$ is 1.

7. A compound as in claim 1 wherein X and each R' are hydrogen, Y is lower alkenylene, Z is carbonyl, R is phenyl and $n$ is 1.

8. A compound as in claim 4 wherein the lower alkylene group is ethylene and the lower alkenylene group is ethenyl.

9. A compound as in claim 4 wherein the alkylene group is propylene and the lower alkenylene group is ethenyl.

10. A compound as in claim 5 wherein the lower alkylene group is methylene and the lower alkenylene group is ethenyl.

No references cited.

HENRY R. JILES, Primary Examiner

H. I. MOATZ, Assistant Examiner

U.S. Cl. X.R.

260—239, 240, 247.2, 294, 294.8, 295, 295.5, 326, 326.12, 326.13, 326.14, 326.15, 326.16, 332.2, 347.3, 515, 521, 557, 562, 570.5, 578, 592, 602, 612, 622, 644, 645, 646, 999